US006793901B2

(12) United States Patent
Cao et al.

(10) Patent No.: US 6,793,901 B2
(45) Date of Patent: Sep. 21, 2004

(54) SYNTHESIS OF MOLECULAR SIEVES HAVING THE CHA FRAMEWORK TYPE

(75) Inventors: Guang Cao, Branchburg, NJ (US); Matu J. Shah, Livingston, NJ (US); Karl G. Strohmaier, Port Murray, NJ (US); Richard B. Hall, Whitehouse Station, NJ (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 33 days.

(21) Appl. No.: 10/171,257

(22) Filed: Jun. 12, 2002

(65) Prior Publication Data

US 2003/0231999 A1 Dec. 18, 2003

(51) Int. Cl.[7] .......................... C01B 37/06; C01B 37/08

(52) U.S. Cl. .............. 423/305; 423/306; 423/DIG. 30; 502/208; 502/214

(58) Field of Search ................................ 423/705, 306, 423/305, DIG. 30; 502/208, 214

(56) References Cited

U.S. PATENT DOCUMENTS

| | | | | |
|---|---|---|---|---|
| 4,310,440 | A | 1/1982 | Wilson et al. | 252/435 |
| 4,440,871 | A | 4/1984 | Lok et al. | 502/214 |
| 4,786,487 | A | 11/1988 | Kuehl | 423/306 |
| 4,861,739 | A | 8/1989 | Pellet et al. | 502/64 |
| 5,096,684 | A | 3/1992 | Guth et al. | 423/306 |
| 5,609,843 | A * | 3/1997 | Wendelbo | 423/306 |
| 5,663,471 | A * | 9/1997 | Kvisle et al. | 585/639 |
| 6,001,328 | A | 12/1999 | Lillerud et al. | 423/718 |
| 6,126,415 | A | 10/2000 | Lasko | 423/706 |
| 6,620,983 | B1 * | 9/2003 | Cao et al. | 585/640 |
| 6,680,278 | B2 * | 1/2004 | Cao et al. | 502/214 |

FOREIGN PATENT DOCUMENTS

| | | | |
|---|---|---|---|
| EP | 0 103 117 | 3/1984 | C01B/33/28 |
| EP | 0 993 867 | 4/2000 | |
| EP | 993 867 | 9/2000 | |
| WO | WO 98/15496 | 4/2000 | |
| WO | WO 01/36328 | 5/2001 | |

OTHER PUBLICATIONS

Meier et al., "Atlas of Zeolite Framework Types," Fifth Revised Edition, p. 96 (2001).

E. H. Halvorsen, "Synthesis and Characterization of Aluminophosphate Molecular Sieve" Ph.D. Theisis, University of Oslo, (1996).

Wilson et al., "The Characteristics of SAPO–34 which Influence the Conversion of Methanol to Light Oelfins," Microporous and Mesoporous Materials, vol. 29, pp. 117–126, (1999).

Feng et al., Amine–directed Synthesis and Crystal Structures of Phosphate–based Zeolite Analoga, Microporous and Mesoporous Meterials, vol. 23, pp. 221–229 (1998).

(List continued on next page.)

Primary Examiner—David Sample
(74) Attorney, Agent, or Firm—Jaimes Sher; Edward F. Sherer (57) ABSTRACT

The invention is directed to a method for preparing microporous aluminophosphate or silicoaluminophosphate molecular sieves having the CHA framework type, the process comprising the steps of a) forming a reaction mixture comprising a source of aluminum, a source of phosphorus, optionally a source of silicon, at least one source of fluoride ions and at least one template containing one or more N,N-dimethylamino moieties, b) inducing crystallization of aluminophosphate and/or silicoaluminophosphate molecular sieve from the reaction mixture; c) recovering aluminophosphate and/or silicoaluminophosphate molecular sieve from the reaction mixture. The invention also relates to the molecular sieves obtained by this method and to molecular sieve catalyst compositions containing these molecular sieves.

34 Claims, 2 Drawing Sheets

OTHER PUBLICATIONS

Pluth et al., *Silicoaluminophosphate with Encapsulated Methylbutylamine Species: Chabazite Structure, Charge Coupling Between Framework and Inferred Ammonium Species, and Severe Molecular Disorder*, J.Phys.Chem., vol. 93, pp. 6516–6520, (1989).

Prakash et al., *Synthesis and Characterization of SAPO–5 Molecular Sieve Using N, N–dimethylbenzylamine as Template*, Microporous Materials, vol. 2, pp. 83–89, (1994).

Liu et al., *New Insights into the Crystallization Mechanism of Microporous $AlPO_4$–$21^1$*, Microporous and Mesoporous Materials, vol. 22, pp. 33–41 (1998).

Harding et al., *Microcrystal Structure Determination of $AlPO_4$–CHA Using Synchrotron Radiation*, Acta Cryst., vol. C50, pp. 852–854, (1994).

* cited by examiner

SYNTHESIS OF MOLECULAR SIEVES HAVING THE CHA FRAMEWORK TYPE

FIELD OF INVENTION

This invention relates to the synthesis of aluminophosphate and silicoaluminophosphate molecular sieves having the CHA framework type. In particular the present invention relates to the synthesis of aluminophosphate and silicoaluminophosphate molecular sieves having the CHA framework type using templates that contain at least one dimethylamino moiety in combination with a source of fluoride.

BACKGROUND OF THE INVENTION

Olefins are traditionally produced from petroleum feedstock by catalytic or steam cracking processes. These cracking processes, especially steam cracking, produce light olefin(s) such as ethylene and/or propylene from a variety of hydrocarbon feedstocks. It has been known for some time that oxygenates, especially alcohols, e.g. methanol, are convertible into light olefin(s). The preferred methanol conversion process is generally referred to as methanol-to-olefin(s) (MTO) process, where methanol is converted to primarily ethylene and propylene in the presence of a molecular sieve.

Some of the most useful molecular sieves for converting methanol to olefin(s) are the metalloaluminophosphates such as the silicoaluminophosphates (SAPO's). There are a wide variety of SAPO molecular sieves known in the art, of these the more important examples include SAPO-5, SAPO-11, SAPO-18, SAPO-34, SAPO-35, SAPO41, and SAPO-56. For the methanol-to-olefins process SAPO molecular sieves having the CHA framework and especially SAPO-34 are particularly important catalysts. The CHA framework type has a double six-ring structure in an ABC stacking arrangement. The pore openings of the structure are defined by eight member rings that have a diameter of about 4.0 Å, and cylindrical cages within the structure of approximately 10×6.7 Å type ("Atlas of Zeolite Framework Types", 2001, 5th Edition, p. 96). Other SAPO molecular sieves of CHA framework type include SAPO-44, SAPO-47 and ZYT-6.

The synthesis of $AlPO_4$ and SAPO molecular sieves is a complicated process. There are a number of variables, which need to be controlled in order to optimise the synthesis in terms of the purity, yield, and quality of the molecular sieve produced. Of these variables the choice of template (hereinafter also referred to as templating agent) is usually one of the most important in determining which framework type is obtained.

One desirable group of silicoaluminophosphate molecular sieves are those that have low silicon contents. Silicoaluminophosphates of the CHA framework type with low silicon contents are particularly desirable for use in the methanol-to-olefins process. Wilson, et al., reported that it is beneficial to have lower Si content for methanol-to-olefins reaction (*Microporous and Mesoporous Materials*, 29, 117–126, 1999). Low Si content has the effect of reducing propane formation and decreasing catalyst deactivation.

In U.S. Pat. No. 4,440,871 (Lok et.al) the synthesis of a wide variety of SAPO materials of various framework types are described with a number of specific examples. Also disclosed are a large number of possible organic templates, with some specific examples. In the specific examples a number of CHA framework type materials are described. The preparation of SAPO-34 is reported, using tetraethylammonium hydroxide (TEAOH), or isopropylamine, or mixtures of TEAOH and dipropylamine (DPA) as templates. Also disclosed in this patent is a specific example that utilises cyclohexylamine in the preparation of SAPO-44. Although other template materials are described in this patent there are no other templates indicated as being suitable for preparing SAPO's of CHA framework type. Certain aminoalcohols are mentioned, including triethanolamine, N-methyldiethanolamine, N-methylethanolamine, N,N-dimethylethanolamine and N,N-diethylethanolamine as possible templates for SAPO molecular sieves. Of these materials N,N-diethylethanolamine is shown to produce SAPO-5, which is of framework type AFI. For the other aminoalcohols no indication is provided as to which SAPO or which framework type may be obtained through their use.

Since the synthesis of SAPO-34 was reported in U.S. Pat. No. 4,440,871, tetraethylammonium hydroxide (TEAOH) either alone, or in combination with dipropylamine (DPA), has been the preferred template for preparing SAPO-34. However, there are problems associated with the use of TEAOH and DPA. When used alone, TEAOH affords a limited range of synthesis parameters. For example, under certain conditions TEAOH will also template the synthesis of SAPO-18 which has the AEI framework type. TEAOH is thus relatively intolerant to synthesis condition variations. TEAOH is sometimes combined with DPA. However, DPA has a low boiling point (110° C.) resulting in the need for production plants that can handle high pressures. In certain countries, the use of DPA requires special regulatory authorizations due to its toxicity. Also, DPA is an aggressive template and is often implicated in re-dissolution of the silicoaluminophosphate molecular sieve during its synthesis, resulting in poor quality crystalline product due to surface pitting of the crystals. Finally, it has proved difficult up to now to make pure phase CHA silicoaluminophosphate molecular sieves with a low silica to alumina ratio.

In U.S. Pat. No. 4,440,871, it was reported that SAPO-44 was obtained "as the major phase" using cyclohexylamine as a template. In U.S. Pat. No. 6,162,415 (Liu, et.al.), relatively pure CHA SAPO-44 was obtained using the same template but with control of the ratio of template to aluminium source and the ratio of phosphorous source to aluminiumn source.

In European Patent Publication No. 0,993,867, it was reported that the use of methylbutylamine resulted in SAPO-47 and the use of cyclohexylamine resulted in impure SAPO-44. Methylbutylamine has an even lower boiling point, at 91° C., than DPA.

U.S. Pat. No. 4,861,739 (Pellet, et al.), Example 102, it was reported that the use of N,N-diethylethanolamine produced CoAPSO-47, having Si concentrated on the peripheries of the crystal and Co at the centre.

In U.S. Pat. No. 4,310,440 (Wilson et.al), triethanolamine, N,N-dimethylethanolamine, N,N-diethylethanolamine, N-methyldiethanolamine, and N-methylethanolamine, were all used to prepare $AlPO_4$-5, aluminophosphates of framework type AFI. N-methylethanolamine was also reported to produce $AlPO_4$-21 of framework type AWO.

In European Patent Publication No. 0,993,867, it was reported that diethanolamine produced SAPO-34 and SAPO-5 under different synthesis conditions.

In the art various attempts have been made to improve the synthesis of $AlPO_4$ or SAPO molecular sieves. One approach has been the addition of a source of fluoride ions to the synthesis mixture.

In U.S. Pat. No. 5,096,684 (Guth et.al.), morpholine and tetraethylammonium hydroxide were found to template the production of SAPO-34 when in the presence of HF. According to Guth et.al. the use of HF in combination with the organic template results in silicoaluminophosphates which have improved thermal and hydrolytic stability.

In U.S. Pat. No. 4,786,487 (Kuehl et.al.), SAPO-20 was produced from synthesis mixtures containing tetramethylammonium hydroxide and fluoride ions from water soluble sources of fluoride such as Na, K and ammonium fluoride.

In U.S. Pat. No. 6,001,328 (Lillerud et.al.), a silicoaluminophosphate indicated as UiO-S7 was prepared using tetramethylammonium hydroxide pentahydrate or tetramethylammonium hydroxide, in combination with HF.

In a Ph.D. thesis (E. H. Halvorsen, University of Oslo, 1996), it was reported that low silica SAPO-34, designated as UiO-S4, was produced using TEAOH template in combination with HF.

Wilson et al., reported that it is beneficial to have lower Si content for methanol-to-olefins reaction (Microporous and Mesoporous Materials, 29, 117–126, 1999). Low Si content has the effect of reducing propane formation and decreasing catalyst deactivation.

As can be seen from the disclosures described herein, there have been a number of attempts to find alternative templates for the CHA framework type with limited success. It is desirable therefore to find new templates and template systems that are specific for the synthesis of molecular sieves having the CHA framework type. In addition there is a need for new template systems that afford a more effective control of the final composition of the SAPO molecular sieve materials and, in particular, of the Si content of the final product. In addition a further need is to obtain SAPO materials having the CHA framework type that have a low acid density, which is directly related to low silica content.

SUMMARY OF THE INVENTION

The present invention provides a method for preparing aluminophosphate or silicoaluminophosphate molecular sieves of CHA framework type, the process comprising the steps of;

a) forming a reaction mixture comprising a source of aluminum, a source of phosphorus, at least one source of fluoride ions and at least one template containing one or more dimethylamino moieties, and optionally a source of silicon, b) inducing crystallization of aluminophosphate and/or silicoaluminophosphate molecular sieve from the reaction mixture, c) recovering aluminophosphate and/or silicoaluminophosphate molecular sieve from the reaction mixture.

The process of the present invention results in new molecular sieve materials, which, as synthesized, have unique X-ray diffraction patterns. Thus the process of the present invention provides for a variety of new materials that have the XRD patterns as described below.

In one embodiment of the present invention there is provided an aluminophosphate or silicoaluminophosphate molecular sieve, substantially of CHA framework type, comprising, preferably within its intracrystalline structure, fluoride and at least one template which contains one or more N,N-dimethylamino moieties.

In another embodiment of the present invention there is provided a molecular sieve, which has a characteristic X-ray powder diffraction pattern containing at least the d-spacings as set forth in Table Ia:

TABLE Ia

| 2 θ | d (A) | I % |
|---|---|---|
| 9.660 | 9.15 | 100 |
| 14.059 | 6.30 | 12 |
| 15.359 | 5.76 | 22 |
| 16.201 | 5.47 | 30 |
| 17.719 | 5.00 | 27 |
| 17.900 | 4.95 | 38 |
| 20.219 | 4.39 | 20 |
| 21.479 | 4.13 | 34 |
| 21.959 | 4.04 | 19 |
| 22.200 | 4.00 | 46 |
| 23.339 | 3.81 | 12 |
| 24.440 | 3.64 | 16 |
| 25.081 | 3.55 | 27 |
| 25.241 | 3.53 | 40 |
| 26.381 | 3.38 | 11 |
| 30.140 | 2.96 | 14 |
| 30.480 | 2.93 | 16 |
| 31.519 | 2.84 | 23 |
| 33.261 | 2.69 | 13 |

In another embodiment of the present invention there is provided a molecular sieve, which has a characteristic X-ray powder diffraction pattern containing at least the d-spacings as set forth in Table Ib:

TABLE Ib

| 2 θ | d (A) | I % |
|---|---|---|
| 9.660 | 9.15 | 100 |
| 12.439 | 7.11 | 6 |
| 13.460 | 6.57 | 8 |
| 13.881 | 6.37 | 7 |
| 14.059 | 6.29 | 12 |
| 15.359 | 5.76 | 22 |
| 16.201 | 5.47 | 30 |
| 17.719 | 5.00 | 27 |
| 17.900 | 4.95 | 38 |
| 19.439 | 4.56 | 6 |
| 20.219 | 4.39 | 20 |
| 21.479 | 4.13 | 34 |
| 21.959 | 4.04 | 19 |
| 22.200 | 4.00 | 46 |
| 22.960 | 3.87 | 7 |
| 23.339 | 3.81 | 12 |
| 24.440 | 3.64 | 16 |
| 24.739 | 3.60 | 8 |
| 25.081 | 3.55 | 27 |
| 25.241 | 3.53 | 40 |
| 26.381 | 3.38 | 11 |
| 27.081 | 3.29 | 5 |
| 30.140 | 2.96 | 14 |
| 30.480 | 2.93 | 16 |
| 30.699 | 2.91 | 7 |
| 31.141 | 2.89 | 7 |
| 31.519 | 2.84 | 23 |
| 32.539 | 2.75 | 6 |
| 33.261 | 2.69 | 13 |
| 39.619 | 2.27 | 5 |

It is preferred that the molecular sieve as identified in Table Ia or Ib comprises N,N-dimethylethanolamine and fluoride, more preferably within its intra-crystalline structure.

In yet another embodiment of the present invention there is provided a molecular sieve, which has a characteristic X-ray powder diffraction pattern containing at least the d-spacings as set forth in Table IIa:

TABLE IIa

| 2 θ | d (A) | I % |
|---|---|---|
| 9.620 | 9.19 | 96 |
| 12.200 | 7.25 | 11 |
| 13.781 | 6.42 | 42 |
| 15.961 | 5.55 | 26 |
| 17.681 | 5.01 | 35 |
| 18.282 | 4.85 | 19 |
| 20.019 | 4.43 | 12 |
| 21.141 | 4.20 | 27 |
| 21.821 | 4.07 | 100 |
| 23.519 | 3.78 | 16 |
| 25.180 | 3.53 | 11 |
| 25.900 | 3.44 | 23 |
| 27.819 | 3.20 | 15 |
| 28.461 | 3.13 | 14 |
| 29.859 | 2.99 | 10 |
| 31.059 | 2.88 | 19 |
| 31.340 | 2.85 | 15 |
| 32.699 | 2.74 | 34 |

In a further embodiment of the present invention there is provided a molecular sieve, which has a characteristic X-ray powder diffraction pattern containing at least the d-spacings as set forth in Table IIb:

TABLE IIb

| 2 θ | d (A) | I % |
|---|---|---|
| 9.620 | 9.19 | 96 |
| 12.200 | 7.25 | 11 |
| 13.259 | 6.67 | 8 |
| 13.781 | 6.42 | 42 |
| 15.259 | 5.80 | 8 |
| 15.961 | 5.55 | 26 |
| 17.681 | 5.01 | 35 |
| 18.282 | 4.85 | 19 |
| 19.760 | 4.49 | 6 |
| 20.019 | 4.43 | 12 |
| 21.141 | 4.20 | 27 |
| 21.821 | 4.07 | 100 |
| 22.539 | 3.94 | 9 |
| 23.519 | 3.78 | 16 |
| 25.180 | 3.53 | 11 |
| 25.900 | 3.44 | 23 |
| 27.819 | 3.20 | 15 |
| 28.461 | 3.13 | 14 |
| 29.859 | 2.99 | 10 |
| 30.420 | 2.94 | 7 |
| 31.059 | 2.88 | 19 |
| 31.340 | 2.85 | 15 |
| 32.699 | 2.74 | 34 |
| 35.680 | 2.51 | 5 |
| 36.302 | 2.47 | 5 |
| 40.560 | 2.22 | 6 |
| 42.000 | 2.15 | 7 |
| 49.641 | 1.83 | 7 |

It is preferred that the molecular sieve as identified in Tables IIa or IIb comprises N,N-dimethylpropylenediamine and fluoride, more preferably within its intra-crystalline structure.

In another embodiment the present invention provides a method for the manufacture of a molecular sieve catalyst composition, the method comprising forming a molecular sieve catalyst composition from a mixture comprising at least one formulating agent and at least one aluminophosphate and/or silicoaluminophosphate molecular sieve of CHA framework type comprising, preferably within its intra-crystalline structure, fluoride and at least one template containing one or more N,N-dimethylamino moieties, or at least one aluminophosphate or silicoaluminophosphate molecular sieve as obtained from a process utilising a template comprising one or more N,N-dimethylamino moieties and a source of fluoride ions.

In yet a further embodiment the present invention provides for a molecular sieve catalyst composition comprising at least one aluminophosphate and/or silicoaluminophosphate molecular sieve of CHA framework type comprising, preferably within its intra-crystalline structure, fluoride and at least one template containing one or more N,N-dimethylamino moieties, or at least one aluminophosphate or silicoaluminophosphate molecular sieve as obtained from a process utilising a template comprising one or more N,N-dimethylamino moieties and a source of fluoride ions, in admixture with at least one formulating agent.

In a further embodiment the present invention provides for the use of a template comprising one or more N,N-dimethylamino moieties in combination with a source of fluoride ions in the synthesis of aluminophosphate or silicoaluminophosphates molecular sieves of CHA framework type.

BRIEF DESCRIPTION OF THE DRAWINGS

The present invention will be better understood by reference to the Detailed Description of the Invention when taken together with the attached drawings wherein.

DETAILED DESCRIPTION OF THE INVENTION

Introduction

The invention is primarily directed toward a method for synthesising aluminophosphate (AlPO's) having the CHA framework type and silicoaluminophosphates (SAPO's) having the CHA framework type. In particular it has been found that, when used in combination with a source of fluoride ions, a specific group of organic amines are effective templates for synthesizing AlPO's of the CHA framework type or SAPO's of the CHA framework type. It has also been found that this combination allows the preparation of high purity molecular sieves having the CHA framework type. Furthermore, it has been found that the use of the combination of specific templates containing one or several N,N-dimethylamino moieties with fluoride ions in the synthesis of molecular sieves affords the production of silicoaluminophosphates of framework type CHA with low silica contents.

It is also possible to utilise the combination of fluoride ions and organic compounds containing one or more N,N-dimethylamino moieties with other known templates for the synthesis of silicoaluminophosphates of CHA framework type in a dual template synthesis. In particular, the combination of a source of fluoride ions and templates containing one or more N,N-dimethylamino moieties can be used with templates containing a tetraethylammonium cation to produce low acidity silicoaluminophosphates of CHA framework type. Molecular sieve catalyst compositions containing the molecular sieves of the present invention are particularly useful for methanol-to-olefins conversions.

Molecular Sieves

The AlPO or SAPO molecular sieves of the present invention may be represented by the empirical formula, on an anhydrous basis:

$$mR{:}F_a\,(Si_xAl_yP_z)O_2$$

wherein R represents at least one templating agent comprising one or more N,N-dimethylamino moieties; m is the number of moles of R per mole of $(S_xAl_yP_z)O_2$ and m has a value from 0.0417 to 0.3333, preferably 0.0833 to 0.25, and most preferably from 0.125 to 0.1667; x, y, and z respectively represent the mole fraction of Si, Al and P as tetrahedral oxides. F indicates fluoride ion and "a" is the number of moles of F per mole of $(Si_xAl_yP_z)O_2$; a has a value between 0.001 to 0.167. For AlPO molecular sieves, x is zero.

In one embodiment, m is greater than or equal to 0.05, and x is less than or equal to 0.2, y and z are greater than or equal to 0.01. In another embodiment, m is in the range from greater than 0.01 to about 0.4, x is less than or equal to 0.1, y is in the range of from 0.4 to 0.7, and z is in the range of from 0.25 to 0.9, more preferably m is in the range of from 0.08 to 0.25, x is less than or equal to 0.08, y is in the range of from 0.4 to 0.6, and z is in the range of from 0.3 to 0.5. Preferably, when the molecular sieve is a SAPO, x is greater than or equal to 0.01.

Prior to calcination, the molecular sieves of the invention substantially have the CHA framework type: the XRD patterns of the as-synthesized molecular sieves provide no immediate indication that these materials have the CHA framework type. However, when the molecular sieves are calcined, the resulting ALPO's or SAPO's have an XRD pattern typical of the CHA framework type ans are of high purity in terms of their framework type. The molecular sieves prepared according to the present invention have little or no intergrowth with other molecular sieve framework type.

When the molecular sieves are calcined the organic template is removed and the resulting silicoaluminophosphates have a CHA framework type and are of substantially high purity in terms of their framework type with little or no intergrowth with other silicoaluminophosphate or aluminophosphate framework types. In the present specification when reference is made to a silicoaluminophosphate substantially of CHA framework type or of substantially high purity in terms of their framework type it is meant a silicoaluminophosphate molecular sieve which comprises 60% or greater of the CHA framework type, preferably 70% or greater of CHA framework type and most preferably 90% or greater of the CHA framework type as determined by XRD.

Molecular Sieve Synthesis

Generally, aluminophosphate and silicoaluminophosphate molecular sieves are synthesized by the hydrothermal crystallization of one or more of a source of aluminium, a source of phosphorous, a source of silicon for silicoaluminophosphate, and a templating agent (or template). Typically, in the method of the present invention a combination of a source of aluminium, a source of phosphorous, one or more templating agents, a source of fluoride, and, optionally, one or more metal containing compounds are placed in a sealed pressure vessel, optionally lined with an inert plastic such as polytetrafluoroethylene, and heated, under a crystallization pressure and temperature, until a crystalline material is formed, and then recovered by filtration, centrifugation and/or decanting.

In a typical synthesis of the molecular sieve, the phosphorous-, aluminium-, and/or silicon-containing components are mixed, preferably while stirring and/or agitation and/or seeding with a crystalline material, optionally with an alkali metal, in a solvent such as water, and one or more templating agents, to form a synthesis mixture. To this synthesis mixture or gel is added the source of fluoride. This mixture or gel is then heated under crystallization conditions of pressure and temperature, for example as described in U.S. Pat. No. 4,440,871 which is fully incorporated by reference.

The templates used in the process of the present invention contain one or more N,N-dimethylamino moieties and preferably have the following general structure:

$$(CH_3)_2N{-}R,$$

wherein R is a substituted or un-substituted aliphatic or cycloaliphatic group. R is selected from the group consisting of linear or branched alkyl groups having from 1 to 12 carbon atoms, cycloalkyl groups having from 1 to 8 carbon atoms, linear or branched alcohols having from 1 to 12 carbon atoms, linear or branched amine-containing groups having from 1 to 12 carbon atoms. Preferably, R contains an alkyl group of from 1 to 12 carbon atoms, more preferably 1 to 6 carbon atoms, and most preferably 1 to 5 carbon atoms.

In a more preferred embodiment the template is a selected from one or more of the following N,N-dimethylamino compounds: N,N-dimethylethanolamine, N,N-dimethylbutanolamine, N,N-dimethylheptanolamine, N,N-dimethylhexanolamine, N,N-dimethylethylenediamine, N,N-dimethylpropylenediamine, N,N-dimethylbuytlenediamine, N,N-dimethylpentylamine, N,N-dimethylhexylenediamine, N,N-dimethylheptylenediamine, or dimethylethylamine, dimethylpropylamine, dimethylheptylamine or dimethylhexylamine. More preferably the template is selected from one or more of the following N,N-dimethylamino compounds: N,N-dimethylethanolamine or N,N-dimethylpropylenediamine. Most preferably the template is N,N-dimethylethanolamine or N,N-dimethylpropylenediamine.

In a further embodiment the combination of template comprising one or more dimethylamino moieties and of a source of fluoride ions is used with one or more additional templates normally used in the manufacture of silicoaluminophosphates of CHA framework type. These additional templates include: the group of tetraethylammonium compounds, such as tetraethyl ammonium hydroxide (TEAOH), tetraethyl ammonium phosphate, tetraethyl ammonium fluoride, tetraethyl ammonium bromide, tetraethyl ammonium chloride and tetraethyl ammonium acetate and also include DPA, isopropylamine, cyclohexylamine, methylbutylamine, morpholine, diethanolamine, and triethylamine. The use of this template combination produces silicoaluminophosphates of CHA framework type, which have a low silicon/CHA cage ratio and/or more uniform silicon distribution and/or better crystal morphology.

In the method of the present invention, a source of aluminium, a source of phosphorus and optionally a source of silicon are combined with a source of fluoride and the template. Preferably, the ratio of fluorine to alumina ($Al_2O_3$) in the reaction mixture is in the range of from 0.1 to 1.5, more preferably in the range of from 0.3 to 0.6. Preferably, the ratio of fluorine to template is in the range of from 0.033 to 1.5, more preferably in the range of from 0.2 to 0.6.

It has been found that when a template containing at least one N,N-dimethylamino moiety is used in combination with fluoride ions the resulting silicoaluminophosphates have an Si/CHA cage ratio within the range of from 0.0 to 1.0. When tetraethylammonium hydroxide is used as the sole organic templating material Si/CHA cage ratios of about 1 are usually obtained.

The preferred molecular sieves of the present invention have a Si/CHA cage ratio of from 0.01 to 1.0, preferably of from 0.05 to 0.50, more preferably of from 0.10 to 0.45.

The preferred template for use incombination with a source of fluoride ions is either N,N-dimethylethanolamine or N,N-dimethylpropylenediamine.

In one preferred embodiment, when a templating agent and a source of fluoride are used in the synthesis of a molecular sieve, the templating agent and fluoride ions are substantially, preferably completely, removed after crystallization by any well known technique, for example, heat treatments such as calcination. Calcination involves contacting the molecular sieve containing the templating agent with a gas, preferably containing oxygen, at any desired concentration at an elevated temperature sufficient to either partially or completely decompose and oxidize the templating agent and remove the fluoride.

In one embodiment, the calcined molecular sieve has a Si/Al ratio of from 0.01 to 0.1, preferably of from 0.02 to 0.08, more preferably of from 0.02 to 0.07.

The source of fluoride ions may be any compound capable of releasing fluoride ions in the molecular sieve synthesis mixture. Non-limiting examples of such sources of fluoride ions include salts containing one or several fluoride ions, such as metal fluorides, preferably, sodium fluoride, potassium fluoride, calcium fluoride, magnesium fluoride, strontium fluoride, barium fluoride, ammonium fluoride, tetraalkylammonium fluorides, such as tetramethylammonium fluoride, tetraethylammonium fluoride, hydrogen fluoride, and mixtures thereof. Most preferably, the source of fluoride is hydrogen fluoride.

Method for Making Molecular Sieve Catalyst Compositions

The molecular sieves of the present invention may be combined with one or more formulating agents, to form a molecular sieve catalyst composition or a formulated molecular sieve catalyst composition. The formulating agents may be one or more materials selected from the group consisting of binding agents, matrix or filler materials catalytically active materials and mixtures thereof This formulated molecular sieve catalyst composition is formed into useful shape and sized particles by well-known techniques such as spray drying, pelletizing, extrusion, and the like.

There are many different binders that are useful in forming the molecular sieve catalyst composition. Non-limiting examples of binders that are useful alone or in combination include various types of hydrated alumina, silicas, and/or other inorganic oxide sol. One preferred alumina containing sol is aluminium chlorhydrol. The inorganic oxide sol acts like glue binding the synthesized molecular sieves and other materials such as the matrix together, particularly after thermal treatment. Upon heating, the inorganic oxide sol, preferably having a low viscosity, is converted into an inorganic oxide matrix component. For example, an alumina sol will convert to an aluminium oxide matrix following heat treatment.

Aluminium chlorhydrol, a hydroxylated aluminium based sol containing a chloride counter ion, has the general formula of $Al_mO_n(OH)_oCl_p \cdot x(H_2O)$ wherein m is 1 to 20, n is 1 to 8, o is 5 to 40, p is 2 to 15, and x is 0 to 30. In one embodiment, the binder is $Al_{13}O_4(OH)_{24}Cl_7 \cdot 12(H_2O)$ as is described in G. M. Wolterman, et al., Stud. Surf. Sci. and Catal., 76, pages 105–144 (1993), which is herein incorporated by reference. In another embodiment, one or more binders are combined with one or more other non-limiting examples of alumina materials such as aluminium oxyhydroxide, γ-alumina, boehmite, diaspore, and transitional aluminas such as α-alumina, β-alumina, γ-alumina, δ-alumina, ε-alumina, κ-alumina, and ρ-alumina, aluminium trihydroxide, such as gibbsite, bayerite, nordstrandite, doyelite, and mixtures thereof.

In another embodiment, the binders are alumina sols, predominantly comprising aluminium oxide, optionally including some silicon. In yet another embodiment, the binders are peptised alumina made by treating alumina hydrates such as pseudobohemite, with an acid, preferably an acid that does not contain a halogen, to prepare sols or aluminium ion solutions. Non-limiting examples of commercially available colloidal alumina sols include Nalco 8676 available from Nalco Chemical Co., Naperville, Ill., and Nyacol available from The PQ Corporation, Valley Forge, Pa.

The molecular sieve of the present invention may be combined with one or more matrix material(s). Matrix materials are typically effective in reducing overall catalyst cost, act as thermal sinks assisting in shielding heat from the catalyst composition for example during regeneration, densifying the catalyst composition, increasing catalyst strength such as crush strength and attrition resistance, and to control the rate of conversion in a particular process.

Non-limiting examples of matrix materials include one or more of the following: rare earth metals, metal oxides including titania, zirconia, magnesia, thoria, beryllia, quartz, silica or sols, and mixtures thereof, for example silica-magnesia, silica-zirconia, silica-titania, silica-alumina and silica-alumina-thoria. In one embodiment, matrix materials are natural clays such as those from the families of montmorillonite and kaolin. These natural clays include sabbentonites and those kaolins known as, for example, Dixie, McNamee, Georgia and Florida clays. Non-limiting examples of other matrix materials include: haloysite, kaolinite, dickite, nacrite, or anauxite. In one embodiment, the matrix material, preferably any of the clays, are subjected to well known modification processes such as calcination and/or acid treatment and/or chemical treatment.

In one preferred embodiment, the matrix material is a clay or a clay-type composition, preferably the clay or clay-type composition having a low iron or titania content, and most preferably the matrix material is kaolin. Kaolin has been found to form a pumpable, high solid content slurry; it has a low fresh surface area, and it packs together easily due to its platelet structure. A preferred average particle size of the matrix material, most preferably kaolin, is from about 0.1 μm to about 0.6 μm with a D90 particle size distribution of less than about 1 μm.

In one embodiment, the binder, the molecular sieve and the matrix material are combined in the presence of a liquid to form a molecular sieve catalyst composition, where the amount of binder is from about 2% by weight to about 30% by weight, preferably from about 5% by weight to about 20% by weight, and more preferably from about 7% by weight to about 15% by weight, based on the total weight of the binder, the molecular sieve and matrix material, excluding the liquid (after calcination).

In another embodiment, the weight ratio of the binder to the matrix material used in the formation of the molecular sieve catalyst composition is from 0:1 to 1:15, preferably 1:15 to 1:5, more preferably 1:10 to 1:4, and most preferably 1:6 to 1:5. It has been found that a higher sieve content, lower matrix content, increases the molecular sieve catalyst composition performance, however, lower sieve content, higher matrix material, improves the attrition resistance of the composition.

Upon combining the molecular sieve and the matrix material, optionally with a binder, in a liquid to form a slurry, mixing, preferably rigorous mixing is needed to produce a substantially homogeneous mixture containing the molecular sieve. Non-limiting examples of suitable liquids include one or a combination of water, alcohol, ketones, aldehydes, and/or esters. The most preferred liquid is water. In one embodiment, the slurry is colloid-milled for a period of time sufficient to produce the desired slurry texture, sub-particle size, and/or sub-particle size distribution.

The molecular sieve and matrix material, and the optional binder, may be in the same or different liquid, and maybe combined in any order, together, simultaneously, sequentially, or a combination thereof. In the preferred embodiment, the same liquid, preferably water is used. The molecular sieve, matrix material, and optional binder, are combined in a liquid as solids, substantially dry or in a dried form, or as slurries, together or separately. If solids are added together as dry or substantially dried solids, it is preferable to add a limited and/or controlled amount of liquid.

In one embodiment, the slurry of the molecular sieve, binder and matrix materials is mixed or milled to achieve a sufficiently uniform slurry of sub-particles of the molecular sieve catalyst composition that is then fed to a forming unit that produces the molecular sieve catalyst composition. In a preferred embodiment, the forming unit is spray dryer. Typically, the forming unit is maintained at a temperature sufficient to remove most of the liquid from the slurry, and from the resulting molecular sieve catalyst composition. The resulting catalyst composition when formed in this way takes the form of microspheres.

When a spray drier is used as the forming unit, typically, the slurry of the molecular sieve and matrix material, and optionally a binder, is co-fed to the spray drying volume with a drying gas with an average inlet temperature ranging from 200° C. to 550° C., and a combined outlet temperature ranging from 100° C. to about 225° C. In an embodiment, the average diameter of the spray dried formed catalyst composition is from about 40 $\mu$m to about 300 $\mu$m, preferably from about 50 $\mu$m to about 250 $\mu$m, more preferably from about 50 $\mu$m to about 200 $\mu$m, and most preferably from about 65 $\mu$m to about 90 $\mu$m.

During spray drying, the slurry is passed through a nozzle distributing the slurry into small droplets, resembling an aerosol spray into a drying chamber. Atomization is achieved by forcing the slurry through a single nozzle or multiple nozzles with a pressure drop in the range of from 100 psia to 1000 psia (690 kPaa to 6895 kPaa). In another embodiment, the slurry is co-fed through a single nozzle or multiple nozzles along with an atomisation fluid such as air, steam, flue gas, or any other suitable gas.

In yet another embodiment, the slurry described above is directed to the perimeter of a spinning wheel that distributes the slurry into small droplets, the size of which is controlled by many factors including slurry viscosity, surface tension, flow rate, pressure, and temperature of the slurry, the shape and dimension of the nozzle(s), or the spinning rate of the wheel. These droplets are then dried in a co-current or counter-current flow of air passing through a spray drier to form a substantially dried or dried molecular sieve catalyst composition, more specifically a molecular sieve in powder form.

Generally, the size of the powder is controlled to some extent by the solids content of the slurry. However, control of the size of the catalyst composition and its spherical characteristics are controllable by varying the slurry feed properties and conditions of atomisation.

In another embodiment, the formulated molecular sieve catalyst composition contains from about 1% to about 99%, more preferably from about 5% to about 90%, and most preferably from about 10% to about 80%, by weight of the molecular sieve based on the total weight of the molecular sieve catalyst composition.

In another embodiment, the weight percent of binder in or on the spray dried molecular sieve catalyst composition based on the total weight of the binder, molecular sieve, and matrix material is from about 2% by weight to about 30% by weight, preferably from about 5% by weight to about 20% by weight, and more preferably from about 7% by weight to about 15% by weight.

Once the molecular sieve catalyst composition is formed in a substantially dry or dried state, to further harden and/or activate the formed catalyst composition, a heat treatment such as calcination, at an elevated temperature is usually performed. A conventional calcination environment is air that typically includes a small amount of water vapour. Typical calcination temperatures are in the range from about 400° C. to about 1,000° C., preferably from about 500° C. to about 800° C., and most preferably from about 550° C. to about 700° C., preferably in a calcination environment such as air, nitrogen, helium, flue gas (combustion product lean in oxygen), or any combination thereof.

In one embodiment, calcination of the formulated molecular sieve catalyst composition is carried out in any number of well known devices including rotary calciners, fluid bed calciners, batch ovens, and the like. Calcination time is typically dependent on the degree of hardening of the molecular sieve catalyst composition and the temperature.

In a preferred embodiment, the molecular sieve catalyst composition is heated in nitrogen at a temperature of from about 600° C. to about 700° C. Heating is carried out for a period of time typically from 30 minutes to 15 hours, preferably from 1 hour to about 10 hours, more preferably from about 1 hour to about 5 hours, and most preferably from about 2 hours to about 4 hours.

In addition to the molecular sieve of the present invention, the catalyst compositions of the present invention may comprise one or several other catalytically active materials. In one embodiment, one or several molecular sieves of the present invention are combined with one more of the following non-limiting examples of other catalytically active molecular sieves described in the following: Beta (U.S. Pat. No. 3,308,069), ZSM-5 (U.S. Pat. Nos. 3,702,886, 4,797, 267 and 5,783,321), ZSM-11 (U.S. Pat. No. 3,709,979), ZSM-12 (U.S. Pat. No. 3,832,449), ZSM-12 and ZSM-38 (U.S. Pat. No. 3,948,758), ZSM-22 (U.S. Pat. No. 5,336, 478), ZSM-23 (U.S. Pat. No. 4,076,842), ZSM-34 (U.S. Pat. No. 4,086,186), ZSM-35 (U.S. Pat. No. 4,016,245, ZSM-48 (U.S. Pat. No. 4,397,827), ZSM-58 (U.S. Pat. No. 4,698, 217), MCM-1 (U.S. Pat. No. 4,639,358), MCM-2 (U.S. Pat. No. 4,673,559), MCM-3 (U.S. Pat. No. 4,632,811), MCM-4 (U.S. Pat. No. 4,664,897), MCM-5 (U.S. Pat. No. 4,639, 357), MCM-9 (U.S. Pat. No. 4,880,611), MCM-10 (U.S. Pat. No. 4,623,527)MCM-14 (U.S. Pat. No. 4,619,818), MCM-22 (U.S. Pat. No. 4,954,325), MCM-41 (U.S. Pat. No. 5,098,684), M-41S (U.S. Pat. No. 5,102,643), MCM-48 (U.S. Pat. No. 5,198,203), MCM-49 (U.S. Pat. No. 5,236, 575), MCM-56 (U.S. Pat. No. 5,362,697), AlPO-11 (U.S. Pat. No. 4,310,440), titanium aluminosilicates (TASO), TASO-45 (EP-A- 0 229,- 295), boron silicates (U.S. Pat. No. 4,254,297), titanium aluminophosphates (TAPO) (U.S. Pat. No. 4,500,651), mixtures of ZSM-5 and ZSM-11 (U.S. Pat. No. 4,229,424), ECR-18 (U.S. Pat. No. 5,278,345).

In another embodiment, the molecular sieve of the present invention may be bound to another molecular sieve, as disclosed for example in the following: SAPO-34 bound AlPO4–5 (U.S. Pat. No. 5,972,203), PCT WO 98/57743 published Dec. 23, 1988 (molecular sieve and Fischer-Tropsch), U.S. Pat. No. 6,300,535 (MFI-bound zeolites), and mesoporous molecular sieves (U.S. Pat. Nos. 6,284,696, 5,098,684, 5,102,643 and 5,108,725), which are all herein fully incorporated by reference. Binder may no longer be necessary in such systems.

In a further embodiment, the molecular sieve of the present invention may be combined with a metal catalyst, for example as a Fischer-Tropsch catalyst.

Process for Using the Molecular Sieve catalyst Compositions

The molecular sieve catalysts and compositions of the present invention are useful in a variety of processes including: cracking, hydrocracking, isomerization, polymerisation, reforming, hydrogenation, dehydrogenation, dewaxing, hydrodewaxing, absorption, alkylation, transalkylation, dealkylation, hydrodecylization, disproportionation, oligomerization, dehydrocyclization and combinations thereof.

The preferred processes of the present invention include a process directed to the conversion of a feedstock comprising one or more oxygenates to one or more olefin(s) and a process directed to the conversion of ammonia and one or more oxygenates to alkyl amines and in particular methylamines.

In a preferred embodiment of the process of the invention, the feedstock contains one or more oxygenates, more specifically, one or more organic compound(s) containing at least one oxygen atom. In the most preferred embodiment of the process of invention, the oxygenate in the feedstock is one or more alcohol(s), preferably aliphatic alcohol(s) where the aliphatic moiety of the alcohol(s) has from 1 to 20 carbon atoms, preferably from 1 to 10 carbon atoms, and most preferably from 1 to 4 carbon atoms. The alcohols useful as feedstock in the process of the invention include lower straight and branched chain aliphatic alcohols and their unsaturated counterparts.

Non-limiting examples of oxygenates include methanol, ethanol, n-propanol, isopropanol, methyl ethyl ether, dimethyl ether, diethyl ether, di-isopropyl ether, formaldehyde, dimethyl carbonate, dimethyl ketone, acetic acid, and mixtures thereof. In the most preferred embodiment, the feedstock is selected from one or more of methanol, ethanol, dimethyl ether, diethyl ether or a combination thereof, more preferably methanol and dimethyl ether, and most preferably methanol.

In the most preferred embodiment, the feedstock, preferably of one or more oxygenates, is converted in the presence of a molecular sieve catalyst composition into olefin(s) having 2 to 6 carbons atoms, preferably 2 to 4 carbon atoms. Most preferably, the olefin(s), alone or combination, are converted from a feedstock containing an oxygenate, preferably an alcohol, most preferably methanol, to the preferred olefin(s) ethylene and/or propylene.

The most preferred process is generally referred to as gas-to-olefins (GTO) or alternatively, methanol-to-olefins (MTO). In a MTO process, typically an oxygenated feedstock, most preferably a methanol containing feedstock, is converted in the presence of a molecular sieve catalyst composition into one or more olefin(s), preferably and predominantly, ethylene and/or propylene, often referred to as light olefin(s).

In one embodiment of the process for conversion of a feedstock, preferably a feedstock containing one or more oxygenates, the amount of olefin(s) produced based on the total weight of hydrocarbon produced is greater than 50 weight percent, preferably greater than 60 weight percent, more preferably greater than 70 weight percent.

The feedstock, in one embodiment, contains one or more diluent(s), typically used to reduce the concentration of the feedstock, and are generally non-reactive to the feedstock or molecular sieve catalyst composition. Non-limiting examples of diluents include helium, argon, nitrogen, carbon monoxide, carbon dioxide, water, essentially non-reactive paraffins (especially alkanes such as methane, ethane, and propane), essentially non-reactive aromatic compounds, and mixtures thereof. The most preferred diluents are water and nitrogen, with water being particularly preferred.

The diluent, water, is used either in a liquid or a vapour form, or a combination thereof. The diluent is either added directly to a feedstock entering into a reactor or added directly into a reactor, or added with a molecular sieve catalyst composition. In one embodiment, the amount of diluent in the feedstock is in the range of from about 1 to about 99 mole percent based on the total number of moles of the feedstock and diluent, preferably from about 1 to 80 mole percent, more preferably from about 5 to about 50, most preferably from about 5 to about 25. In one embodiment, other hydrocarbons are added to a feedstock either directly or indirectly, and include olefin(s), paraffin(s), aromatic(s) (see for example U.S. Pat. No. 4,677,242, addition of aromatics) or mixtures thereof, preferably propylene, butylene, pentylene, and other hydrocarbons having 4 or more carbon atoms, or mixtures thereof.

The process for converting a feedstock, especially a feedstock containing one or more oxygenates, in the presence of a molecular sieve catalyst composition of the invention, is carried out in a reaction process in a reactor, where the process is a fixed bed process, a fluidised bed process (includes a turbulent bed process), preferably a continuous fluidised bed process, and most preferably a continuous high velocity fluidised bed process.

The reaction processes can take place in a variety of catalytic reactors such as hybrid reactors that have a dense bed or fixed bed reaction zones and/or fast fluidised bed reaction zones coupled together, circulating fluidised bed reactors, riser reactors, and the like. Suitable conventional reactor types are described in for example U.S. Pat. No. 4,076,796, 6,287,522 (dual riser), and *Fluidization Engineering*, D. Kunii and O. Levenspiel, Robert E. Krieger Publishing Company, New York, N.Y. 1977, which are all herein fully incorporated by reference.

The preferred reactor type are riser reactors generally described in *Riser Reactor, Fluidization and Fluid-Particle Systems*, pages 48 to 59, F. A. Zenz and D. F. Othmo, Reinhold Publishing Corporation, New York, 1960, and U.S. Pat. No. 6,166,282 (fast-fluidised bed reactor), and U.S. patent application Ser. No. 09/564,613 filed May 4, 2000 (multiple riser reactor), which are all herein fully incorporated by reference.

In the preferred embodiment, a fluidised bed process or high velocity fluidised bed process includes a reactor system, a regeneration system and a recovery system.

The reactor system preferably is a fluid bed reactor system having a first reaction zone within one or more riser reactor(s) and a second reaction zone within at least one disengaging vessel, preferably comprising one or more cyclones. In one embodiment, the one or more riser reactor(s) and disengaging vessel is contained within a single reactor vessel. Fresh feedstock, preferably containing one or more oxygenates, optionally with one or more diluent(s), is fed to the one or more riser reactor(s) in which a molecular sieve catalyst composition or coked version thereof is introduced. In one embodiment, the molecular sieve catalyst composition or coked version thereof is contacted with a liquid or gas, or combination thereof, prior to being introduced to the riser reactor(s), preferably the liquid is water or methanol, and the gas is an inert gas such as nitrogen.

In an embodiment, the amount of fresh feedstock fed separately or jointly with a vapour feedstock, to a reactor system is in the range of from 0.1 weight percent to about 85 weight percent, preferably from about 1 weight percent to about 75 weight percent, more preferably from about 5 weight percent to about 65 weight percent based on the total weight of the feedstock including any diluent contained therein. The liquid and vapour feedstocks are preferably the same composition, or contain varying proportions of the same or different feedstock with the same or different diluent.

The feedstock entering the reactor system is preferably converted, partially or fully, in the first reactor zone into a gaseous effluent that enters the disengaging vessel along with a coked molecular sieve catalyst composition. In the preferred embodiment, cyclone(s) within the disengaging vessel are designed to separate the molecular sieve catalyst composition, preferably a coked molecular sieve catalyst composition, from the gaseous effluent containing one or more olefin(s) within the disengaging zone. Cyclones are preferred, however, gravity effects within the disengaging vessel will also separate the catalyst compositions from the gaseous effluent. Other methods for separating the catalyst compositions from the gaseous effluent include the use of plates, caps, elbows, and the like.

In one embodiment of the disengaging system, the disengaging system includes a disengaging vessel; typically a lower portion of the disengaging vessel is a stripping zone. In the stripping zone the coked molecular sieve catalyst composition is contacted with a gas, preferably one or a combination of steam, methane, carbon dioxide, carbon monoxide, hydrogen, or an inert gas such as argon, preferably steam, to recover adsorbed hydrocarbons from the coked molecular sieve catalyst composition that is then introduced to the regeneration system. In another embodiment, the stripping zone is in a separate vessel from the disengaging vessel and the gas is passed at a gas hourly superficial velocity (GHSV) of from 1 $hr^{-1}$ to about 20,000 $hr^{-1}$ based on the volume of gas to volume of coked molecular sieve catalyst composition, preferably at an elevated temperature from 250° C. to about 750° C., preferably from about 350° C. to 650° C., over the coked molecular sieve catalyst composition.

The conversion temperature employed in the conversion process, specifically within the reactor system, is in the range of from about 200° C. to about 1000° C., preferably from about 250° C. to about 800° C., more preferably from about 250° C. to about 750° C., yet more preferably from about 300° C. to about 650° C., yet even more preferably from about 350° C. to about 600° C. most preferably from about 350° C. to about 550° C.

The conversion pressure employed in the conversion process, specifically within the reactor system, varies over a wide range including autogenous pressure. The conversion pressure is based on the partial pressure of the feedstock exclusive of any diluent therein. Typically the conversion pressure employed in the process is in the range of from about 0.1 kPaa to about 5 MPaa, preferably from about 5 kPaa to about 1 MPaa, and most preferably from about 20 kPaa to about 500 kPaa.

The weight hourly space velocity (WHSV), particularly in a process for converting a feedstock containing one or more oxygenates in the presence of a molecular sieve catalyst composition within a reaction zone, is defined as the total weight of the feedstock excluding any diluents to the reaction zone per hour per weight of molecular sieve in the molecular sieve catalyst composition in the reaction zone. The WHSV is maintained at a level sufficient to keep the catalyst composition in a fluidised state within a reactor.

Typically, the WHSV ranges from about 1 $hr^{-1}$ to about 5000 $hr^{-1}$, preferably from about 2 $hr^{-1}$ to about 3000 $hr^{-1}$, more preferably from about 5 $hr^{-1}$ to about 1500 $hr^{-1}$, and most preferably from about 10 $hr^{-1}$ to about 1000 $hr^{-1}$. In one preferred embodiment, the WHSV is greater than 20 $hr^{-1}$; preferably the WRSV for conversion of a feedstock containing methanol and dimethyl ether is in the range of from about 20 $hr^{-1}$ to about 300 $hr^{-1}$.

The superficial gas velocity (SGV) of the feedstock including diluent and reaction products within the reactor system is preferably sufficient to fluidise the molecular sieve catalyst composition within a reaction zone in the reactor. The SGV in the process, particularly within the reactor system, more particularly within the riser reactor(s), is at least 0.1 meter per second (m/sec), preferably greater than 0.5 m/sec, more preferably greater than 1 m/sec, even more preferably greater than 2 m/sec, yet even more preferably greater than 3 m/sec, and most preferably greater than 4 m/sec. See for example U.S. patent application Ser. No. 09/708,753 filed Nov. 8, 2000, which is herein incorporated by reference.

In one preferred embodiment of the process for converting an oxygenate to olefin(s) using a silicoaluminophosphate molecular sieve catalyst composition, the process is operated at a WHSV of at least 20 $hr^{-1}$ and a Temperature Corrected Normalized Methane Selectivity (TCNMS) of less than 0.016, preferably less than or equal to 0.01. See for example U.S. Pat. No. 5,952,538, which is herein fully incorporated by reference.

In another embodiment of the processes for converting an oxygenate such as methanol to one or more olefin(s) using a molecular sieve catalyst composition, the WHSV is from 0.01 $hr^{-1}$ to about 100 $hr^{-1}$, at a temperature of from about 350° C. to 550° C., and silica to $Me_2O_3$ (Me is a Group IIIA or VIII element from the Periodic Table of Elements) molar ratio of from 300 to 2500. See for example EP-0 642 485 B1, which is herein fully incorporated by reference.

Other processes for converting an oxygenate such as methanol to one or more olefin(s) using a molecular sieve catalyst composition are described in PCT WO 01/23500 published Apr. 5, 2001 (propane reduction at an average catalyst feedstock exposure of at least 1.0), which is herein incorporated by reference.

The coked molecular sieve catalyst composition is withdrawn from the disengaging vessel, preferably by one or more cyclones(s), and introduced to the regeneration system. The regeneration system comprises a regenerator where the coked catalyst composition is contacted with a regeneration medium, preferably a gas containing oxygen, under general regeneration conditions of temperature, pressure and residence time.

Non-limiting examples of the regeneration medium include one or more of oxygen, $O_3$, $SO_3$, $N_2O$, NO, $NO_2$, $N_2O_5$, air, air diluted with nitrogen or carbon dioxide, oxygen and water (U.S. Pat. No. 6,245,703), carbon monoxide and/or hydrogen. The regeneration conditions are those capable of burning coke from the coked catalyst composition, preferably to a level less than 0.5 weight percent based on the total weight of the coked molecular sieve catalyst composition entering the regeneration system. The coked molecular sieve catalyst composition withdrawn from the regenerator forms a regenerated molecular sieve catalyst composition.

The regeneration temperature is in the range of from about 200° C. to about 1500° C., preferably from about 300° C. to about 1000° C., more preferably from about 450° C. to about 750° C., and most preferably from about 550° C. to 700° C. The regeneration pressure is in the range of from about 15 psia (103 kPaa) to about 500 psia (3448 kPaa), preferably from about 20 psia (138 kPaa) to about 250 psia (1724 kPaa), more preferably from about 25 psia (l72kPaa) to about 150 psia (1034 kPaa), and most preferably from about 30 psia (207 kPaa) to about 60 psia (414 kPaa).

The preferred residence time of the molecular sieve catalyst composition in the regenerator is in the range of from about one minute to several hours, most preferably about one minute to 100 minutes, and the preferred volume of oxygen in the gas is in the range of from about 0.01 mole percent to about 5 mole percent based on the total volume of the gas.

In one embodiment, regeneration promoters, typically metal containing compounds such as platinum, palladium and the like, are added to the regenerator directly, or indirectly, for example with the coked catalyst composition. Also, in another embodiment, a fresh molecular sieve catalyst composition is added to the regenerator containing a regeneration medium of oxygen and water as described in U.S. Pat. No. 6,245,703, which is herein fully incorporated by reference.

In an embodiment, a portion of the coked molecular sieve catalyst composition from the regenerator is returned directly to the one or more riser reactor(s), or indirectly, by pre-contacting with the feedstock, or contacting with fresh molecular sieve catalyst composition, or contacting with a regenerated molecular sieve catalyst composition or a cooled regenerated molecular sieve catalyst composition described below.

The burning of coke is an exothermic reaction, and in an embodiment, the temperature within the regeneration system is controlled by various techniques in the art including feeding a cooled gas to the regenerator vessel, operated either in a batch, continuous, or semi-continuous mode, or a combination thereof. A preferred technique involves withdrawing the regenerated molecular sieve catalyst composition from the regeneration system and passing the regenerated molecular sieve catalyst composition through a catalyst cooler that forms a cooled regenerated molecular sieve catalyst composition. The catalyst cooler, in an embodiment, is a heat exchanger that is located either internal or external to the regeneration system.

In one embodiment, the cooler regenerated molecular sieve catalyst composition is returned to the regenerator in a continuous cycle, alternatively, (see U.S. patent application Ser. No. 09/587,766 filed Jun. 6, 2000) a portion of the cooled regenerated molecular sieve catalyst composition is returned to the regenerator vessel in a continuous cycle, and another portion of the cooled molecular sieve regenerated molecular sieve catalyst composition is returned to the riser reactor(s), directly or indirectly, or a portion of the regenerated molecular sieve catalyst composition or cooled regenerated molecular sieve catalyst composition is contacted with by-products within the gaseous effluent (PCT WO 00/49106 published Aug. 24, 2000), which are all herein fully incorporated by reference. In another embodiment, a regenerated molecular sieve catalyst composition contacted with an alcohol, preferably ethanol, 1-propnaol, 1-butanol or mixture thereof, is introduced to the reactor system, as described in U.S. patent application Ser. No. 09/785,122 filed Feb. 16, 2001, which is herein fully incorporated by reference.

Other methods for operating a regeneration system are in disclosed U.S. Pat. No. 6,290,916 (controlling moisture), which is herein fully incorporated by reference.

The regenerated molecular sieve catalyst composition withdrawn from the regeneration system, preferably from the catalyst cooler, is combined with a fresh molecular sieve catalyst composition and/or re-circulated molecular sieve catalyst composition and/or feedstock and/or fresh gas or liquids, and returned to the riser reactor(s). In another embodiment, the regenerated molecular sieve catalyst composition withdrawn from the regeneration system is returned to the riser reactor(s) directly, preferably after passing through a catalyst cooler. In one embodiment, a carrier, such as an inert gas, feedstock vapour, steam or the like, semi-continuously or continuously, facilitates the introduction of the regenerated molecular sieve catalyst composition to the reactor system, preferably to the one or more riser reactor(s).

By controlling the flow of the regenerated molecular sieve catalyst composition or cooled regenerated molecular sieve catalyst composition from the regeneration system to the reactor system, the optimum level of coke on the molecular sieve catalyst composition entering the reactor is maintained. There are many techniques for controlling the flow of a molecular sieve catalyst composition described in Michael Louge, *Experimental Techniques, Circulating Fluidised Beds*, Grace, Avidan and Knowlton, eds. Blackie, 1997 (336–337), which is herein incorporated by reference.

Coke levels on the molecular sieve catalyst composition are measured by withdrawing from the conversion process the molecular sieve catalyst composition at a point in the process and determining its carbon content. Typical levels of coke on the molecular sieve catalyst composition, after regeneration is in the range of from 0.01 weight percent to about 15 weight percent, preferably from about 0.1 weight percent to about 10 weight percent, more preferably from about 0.2 weight percent to about 5 weight percent, and most preferably from about 0.3 weight percent to about 2 weight percent based on the total weight of the molecular sieve and not the total weight of the molecular sieve catalyst composition.

In one preferred embodiment, the mixture of fresh molecular sieve catalyst composition and regenerated molecular sieve catalyst composition and/or cooled regenerated molecular sieve catalyst composition contains in the range of from about 1 to 50 weight percent, preferably from about 2 to 30 weight percent, more preferably from about 2 to about 20 weight percent, and most preferably from about 2 to about 10 coke or carbonaceous deposit based on the total weight of the mixture of molecular sieve catalyst compositions. See for example U.S. Pat. No. 6,023,005, which is herein fully incorporated by reference.

The gaseous effluent is withdrawn from the disengaging system and is passed through a recovery system. There are many well-known recovery systems, techniques and sequences that are useful in separating olefin(s) and purifying olefin(s) from the gaseous effluent. Recovery systems generally comprise one or more or a combination of a various separation, fractionation and/or distillation towers, columns, splitters, or trains, reaction systems such as ethylbenzene manufacture (U.S. Pat. No. 5,476,978) and other derivative processes such as aldehydes, ketones and ester manufacture (U.S. Pat. No. 5,675,041), and other associated equipment for example various condensers, heat exchangers, refrigeration systems or chill trains, compressors, knock-out drums or pots, pumps, and the like.

The molecular sieves of the present invention and catalyst compositions of the present invention may be used in the manufacture of alkylamines, using ammonia. Examples of suitable processes are as described in published European Patent Application EP 0 993 867 Al, and in U.S. Pat. No. 6,153,798 to Hidaka et.al, which are herein fully incorporated by reference.

In order to provide a better understanding of the present invention including representative advantages thereof, the following examples are offered.

EXAMPLES

XRD

X-ray Powder Diffractograms were recorded on Siemens D500 diffractometer with voltage of 40 kV and current of 30 mA, using a Cu target and Ni-filter ($\mu$=0.154 nm). Elemental analysis of Al, Si, and P was performed using the Inductively Coupled Plasma (ICP) spectroscopy.

Comparative Example 1

N,N-dimethylethanolamine (DMEA)

The following ingredients were mixed, in sequence, and blended into a uniform gel using a microhomogenizer (Tissue Tearor Model 98730 available from Biospec Products, Inc, USA): 85 wt % $H_3PO_4$ (obtained from Aldrich Chemical Company), $H_2O$, Cabosil™(fumed silica available from Cabot Corporation, Illinois, USA), Catapal™A (71.5 wt % $Al_2O_3$, available from CONDEA Vista Company, Texas, USA), and then N,N-dimethylethanolamine (DMEA) (obtained from Aldrich Chemical Company, USA). The molar ratio of the ingredients was as follows:

3.0 DMEA:1.0 $Al_2O_3$:0.3 $SiO_2$:1.0 $P_2O_5$:50 $H_2O$

The gel was then placed into a Parr bomb with Teflon liner, and was heated to 180° C. for 10 days. The solid product was centrifuged and washed several times with deionized water, and was then dried in a 60° C. vacuum oven overnight to provide a silicoaluminophosphate of the CHA framework type, comprising N,N-dimethylethanolamine within its intra-crystalline structure. X-ray powder patterns of the product confirmed that the product is a silicoaluminophosphate of the CHA framework type. The solid product yield was 7.70% after 10 days of crystallization, based on the weight of the starting synthesis mixture. Elemental analysis of the products gives the following molar composition $Al_{1.0}Si_{0.209}P_{0.799}$. The final product has a Si/Al ratio of 0.209, which equates to a Si/CHA cage ratio of 1.25

This example shows that relatively pure silicoaluminophosphates of the CHA framework type may be synthesized with N,N-dimethylethanolamine as template. Typically when TEAOH is used as the template in such a synthesis the Si/Al ratio is 0.167. The Si/Al atomic ratio of the N,N-dimethylethanolamine derived product is determined at 0.209 by elemental analysis This indicates that the Si/CHA cage ratio is greater than 1 when N,N-dimethylethanolamine is used on its own as template.

Example 1

N,N-dimethylethanolamine (DMEA) as template and HF 8.36 g $H_3PO_4$ (85%), 25.01 g $H_2O$, 4.35 g Catapal™, 0.21 g Cabosil™, and 7.06 g N,N-dimethylethanolamine were mixed, in sequence, into a uniform gel with a microhomogenizer. HF (0.70 g, 50%) was added to the mixture, and the mixture was stirred at room temperature overnight. The composition of the gel was as follows:

2.5 DMEA:0.5HF:1.0$Al_2O_3$:0.1$SiO_2$:1.15$P_2O_5$:50$H_2O$

The mixture was divided into equal parts, which were then sealed in a Teflon lined Parr bomb before being heated to 180° C. for 2 and 5 days. The solid product was centrifuged and washed several times with deionized water, and was dried in a 60° C. vacuum oven. The X-ray powder diffraction patterns indicate that these products have X-ray powder diffraction patterns that differ from those of typical pre-calcined silicoaluminophosphates of CHA framework type. The product yields were 7.7%, and 15.2% after 2 and 5 days of crystallization, respectively, based on the weight of the starting gel.

Elemental analysis of the product obtained after 2 days of crystallization gave the following results: Al, 17.0%; Si, 0.924%; P, 17.8%, F, 2.86%; which corresponds to the following composition: $F_{0.239}Al_{1.0}Si_{0.052}P_{0.912}$. The silicoaluminophosphate had a Si/Al ratio of 0.052 and a Si/CHA cage ratio of 0.052/0.167=0.31. This example shows that DMEA can be mixed with HF to produce a SAPO material having a low Si content.

Figure 1:
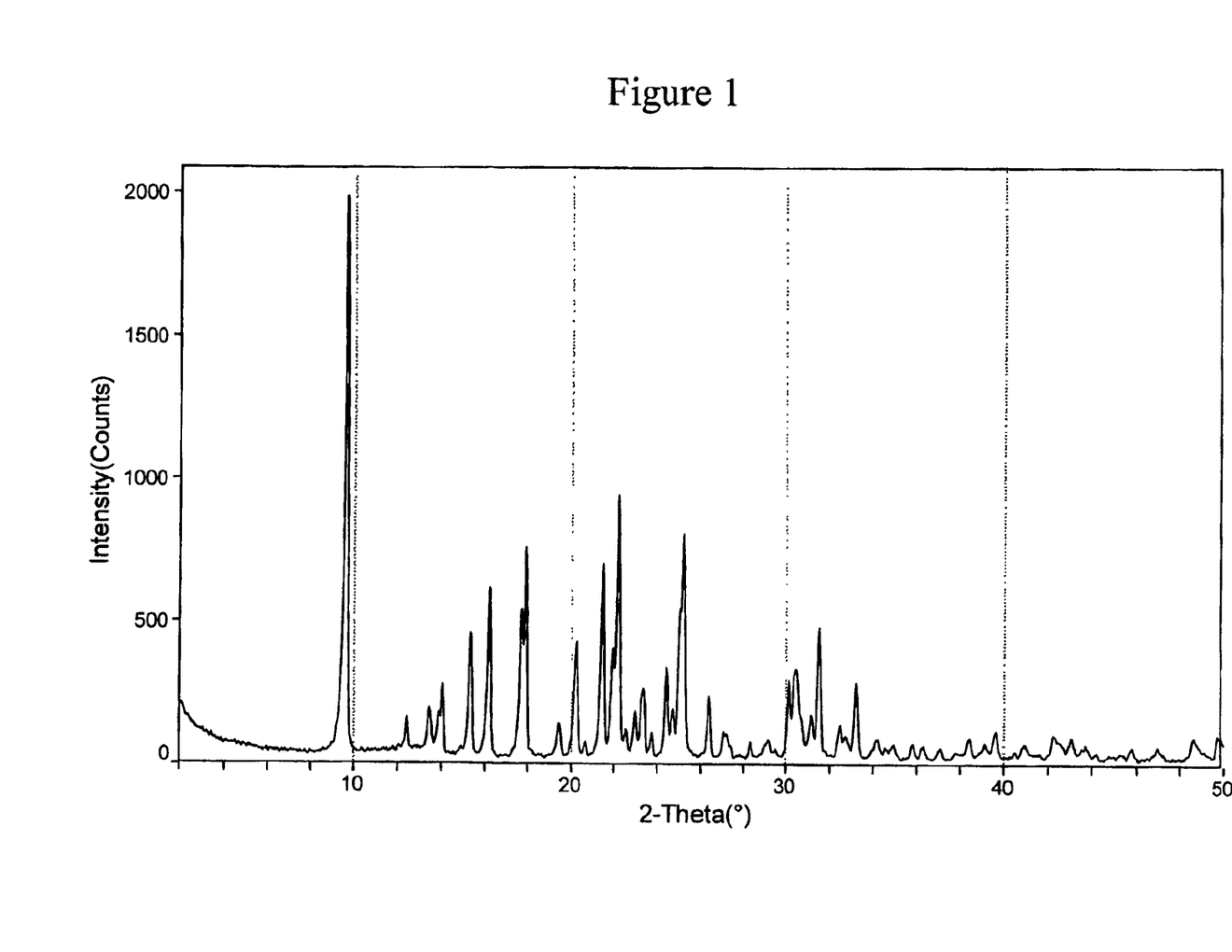
FIG. 1 shows the XRD pattern of a crystalline silicoaluminophosphate molecular sieve of CHA framework type comprising N,N-dimethylethanolamine and fluoride within its intra-crystalline structure.

The product obtained after 5 days of crystallization, was calcined at 550° C. for two hours then at 600° C. for one hour to remove the template and the fluoride ion. The white powder was immediately analyzed after calcination, but with no precaution to avoid exposure to moisture, using X-ray powder diffraction. This confirmed that the low silica materials obtained with N,N-dimethylethanolamine and HF, have a CHA framework type after calcination. The uncalcined materials exhibit a unique XRD pattern from which it is not immediately apparent that molecular sieve has the CHA framework type (see FIG. 1).

Comparative Example 2

The ingredients and procedure of Example 1 were used, except that no HF was added. The synthesis mixture was processed following the same procedure as in Example 2. The products of crystallization gave XRD patterns which indicated that virtually no crystalline material was present. This example illustrates that without HF, low silica SAPO having the CHA framework cannot be obtained using low levels of DMEA as template and low silica in the synthesis gel.

Example 2

HF and Reduced Amount of N,N-dimethylethanolamine (DMEA)

The same ingredients and procedure as in Example 1 were used, but the ingredient ratio was as follows:

2.0DMEA:0.3HF:1.0$Al_2O_3$:0.1$SiO_2$:1.0$P_2O_5$:50$H_2O$

The XRD pattern of the product shows patterns related to, but different from, that of uncalcined SAPO-34, which has a CHA framework type . The solid yield was 11.0 wt % and 16.7 wt %, after 2 and 7 days of crystallization, respectively, based on the total weight of the starting materials.

The product obtained after 7 days of crystallization was calcined at 550° C. for two hours then at 600° C. for one hour to remove the template and the fluoride ions. The white powder was immediately analyzed after calcination, but with no precaution to avoid exposure to moisture, using X-ray powder diffraction, and was found to have the CHA framework type. This confirmed that the low silica materials obtained with N,N-dimethylethanolamine template and HF, have a CHA framework type, even though the uncalcined materials exhibit a different and unique XRD pattern. The product obtained after 7 days of crystallization had the following properties after calcination: composition $Al_{1.0}Si_{0.055}P_{0.866}$; methanol adsorption: 24.6 wt % after calcination. The silicoalumninophosphate has an Si/Al ratio of 0.055 and a Si/CHA cage ratio of 0.33.

Comparative Example 3

The same ingredients and procedures as in Example 2 were used, except that no HF was added. The synthesis mixture was processed following the same procedure as in Example 2 and the products of crystallization gave XRD patterns which indicate that very little crystalline product had been produced. This example illustrates that without HF, low silica SAPO with the CHA framework cannot be obtained using low levels of DMEA as template and low levels of silica source.

Example 3
Preparation of Low Silica SAPO having the CHA Framework Type Using HF, Reduced Amount of N,N-dimethylethanolamine (DMEA) and Reduced Amount of Water The same ingredients and procedures as in Example 1 were used, but the ingredient ratio is as follows:

2.0DMEA:0.3HF:1.0Al$_2$O$_3$:0.1SiO$_2$:1.0P$_2$O$_5$:25H$_2$O

The XRD pattern of the product was related, but different from, that of uncalcined SAPO-34, a material of CHA framework type. The solid yield was 17.8 wt %, after one day of crystallization, based on the total weight of the starting materials. The product had the following composition $Al_{1.0}$, $Si_{0.071}$,$P_{0.926}$. After calcination the sample produced an XRD pattern consistent with the CHA framework type. The molecular sieve has a Si/Al ratio of 0.071, which corresponds to a Si/CHA cage ratio of 0.071/0.167=0.42.

Example 4
Preparation of Aluminophosphate of the CHA Framework Type Using N,N-dimethylpropylenediamine and HF.

The procedure of Example 1 was repeated using N,N-dimethylpropylenediamine (DMAPA) instead of dimethylethanolamine as template. The gel composition was as follows:

1HF:1DMAPA:1Al$_2$O$_3$:1P$_2$O$_5$:40H$_2$O

Figure 2:
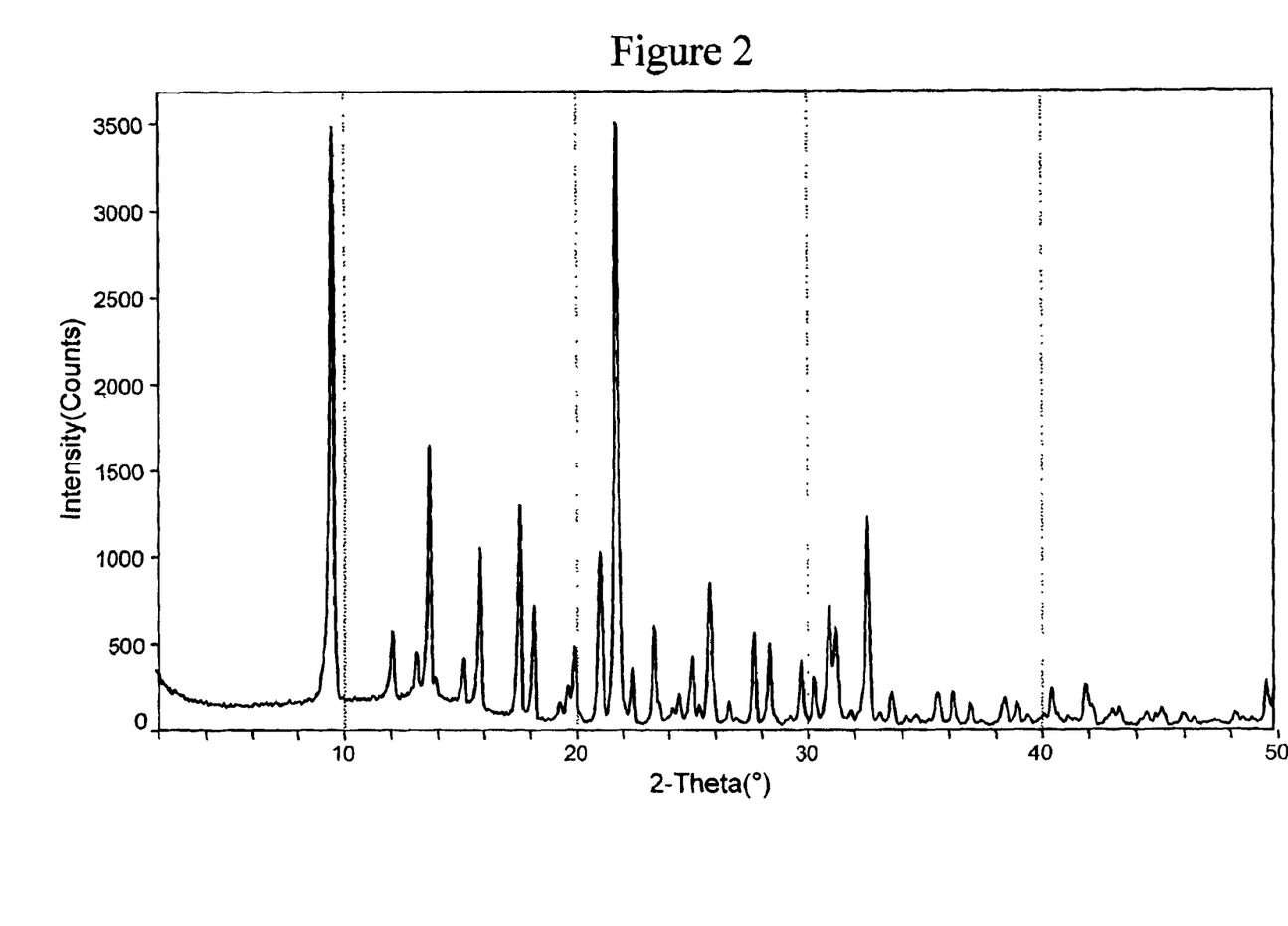
FIG. 2 shows the XRD pattern of a crystalline silicoaluminophosphate molecular sieve of CHA framework type comprising N,N-dimethylpropylenediamine and fluoride within its intra-crystalline structure.

Crystallization was carried out at 170° C. for 24 hours. The solid product yield was 15.0 wt %, based on the total weight of the starting materials. The X-ray powder patterns of the product confirmed that the as-synthesized product is similar to the products obtained with DMEA and HF (FIG. 2), and on calcination and hydration in air the XRD pattern was identical to that of hydrated AlPO$_4$-34 (Tuel, A.; et al., J. Phys. Chem., B 2000, 104, 5697–5705). The composition of the product as synthesized was determined by elemental analysis as $F_{0.292}Al_{1.0}P_{1.01}$.

When a silica source (Cabosil™) was added to the synthesis mixture in the same manner as in the Examples using DMEA, silicoaluminophosphate of CHA framework type formed in the early stages of crystallization. After 20 hours of crystallization the CHA framework type crystals faded away while molecular sieve AlPO$_4$-21 or SAPO-21 of framework type AWO formed.

Comparative Example 4

The procedure of Example 1 was repeated using the following templates in separate synthesis experiments and in combination with HF: 3-(N,N-dimethylamino)-1-propanol and 1-(N,N-dimethylamino)-2-propanol. The X-ray powder patterns of the product confirmed that none of these templates produced AlPO or SAPO of CHA framework type under the conditions used. The XRD analysis indicated formation of AWO and/or unknown phases with each of these templates.

While the present invention has been described and illustrated by reference to particular embodiments, those of ordinary skill in the art will appreciate that the invention lends itself to variations not necessarily illustrated herein. Reference should be made solely to the appended claims for purposes of determining the true scope of the present invention.

What is claimed is:

1. A method for preparing microporous aluminophosphate or silicoaluminophosphate molecular sieves having the CHA framework type, which process comprises:
   (a) forming a reaction mixture comprising a source of aluminum a source of phosphorus, optionally a source of silicon, at least one source of fluoride ions and at least one template containing one or more N,N-dimethylamino moieties,
   (b) inducing crystallization of alumiphosphate and/or silicoaluminophosphate molecular sieve from the reaction mixture,
   (c) recovering aluminophosphate and/or silicoaluminophosphate molecular sieve from the reaction mixture.

2. The method of claim 1, further comprising the step of d) calcining the aluminophosphate and/or silicoaluminophosphate molecular sieve.

3. The method of claim 1, wherein the template comprising one or more N,N-dimethylamino moieties has the following structure:

$(CH_3)_2N\text{—}R$ wherein R substituted or un-substituted aliphatic or cycloaliphatic group.

4. The method of claim 3 wherein R is a linear or branched alkyl group, a linear or branched alcohol, or a linear or branched amine.

5. The method of claim 4, wherein the template is selected from one or more of the following; N,N-dimethylethanolamine, N,N-dimethylbutanolamine, N,N-dimethylheptanolamine, N,N-dimethylhexanolamine, N,N-dimethylethylenediamine, N,N-dimethylpropylenediamine, N,N-dimethylbutylenediamine, N,N-dimethylheptylenediamine, N,N-dimethylhexylenediamine, or dimethylethylamine, dimethylpropylamine, dimethylheptylamine or dimethylhexylamine.

6. The method of claim 4, wherein the alkyl group, alcohol or amine has from 1 to 12 carbon atoms.

7. The method of claim 6, wherein the alkyl group, alcohol or amine has from 1 to 10 carbon atoms.

8. The method of claim 6, wherein the alkyl group, alcohol or amine has from 1 to 8 carbon atoms.

9. The method of claim 1, wherein the template is selected from one or more of the following; N,N-dimethylethanolamine, N,N-dimethylpropylenediamine.

10. The method of claim 1, wherein the template is N,N-dimethylethanolamine.

11. The method of claim 1, wherein the source of fluoride is selected from the group consisting of metal fluorides, ammonium fluoride, tetraalkylammonium fluorides and hydrogen fluoride.

12. The method of claim 11, wherein the source of fluoride is hydrogen fluoride.

13. A method for the manufacture of a molecular sieve catalyst composition, the method comprising forming a molecular sieve catalyst composition from a mixture comprising at least one formulating agent and at least one aluminophosphate and/or silicoaluminophosphate molecular sieve prepared by the method of claim 1.

14. A formulated molecular sieve catalyst composition comprising at least one formulating agent and at least one molecular sieve prepared by the method of claim 1.

15. An aluminophosphate or silicoaluminophosphate molecular sieve, substantially of framework type CHA, comprising within its intra-crystalline structure at least one template containing one or more N,N-dimethylamino moieties and further comprising fluoride.

16. The molecular sieve of claim 15, wherein the template which contains one or more N,N-dimethylamino moieties is N,N-dimethylethanolamine.

17. The molecular sieve of claim 16, wherein fluoride is within the intra-crystalline structure of the molecular sieve.

18. A formulated molecular sieve catalyst composition comprising at least one formulating agent and at least one molecular sieve according to claim 16.

19. The molecular sieve of claim 15, wherein the template which contains one or more dimethylamino moieties is dimethylpropylenediamine.

20. The molecular sieve of claim 19, wherein fluoride is within the intra-crystalline structure of the molecular sieve.

21. A formulated molecular sieve catalyst composition comprising at least one formulating agent and at least one molecular sieve according to claim 19.

22. The molecular sieve of claim 15, wherein fluoride is within the intra-crystalline structure of the molecular sieve.

23. A crystalline silicoaluminophosphate molecular sieve having a characteristic X-ray powder diffraction pattern containing at least the d-spacings, as set forth in Table Ia.

24. The molecular sieve of claim 23, comprising N,N-dimethylethanolamine and fluoride within its intra-crystalline structure.

25. The molecular sieve of claim 23 having a characteristic X-ray powder diffraction pattern containing at least the d-spacings as set forth in Table Ib.

26. The molecular sieve of claim 25, comprising N,N-dimethylethanolamine and fluoride within its intra-crystalline structure.

27. A crystalline silicoaluminophosphate molecular sieve having a characteristic X-ray powder diffraction pattern containing at least the d-spacings, as set forth in Table IIa.

28. The molecular sieve of claim 27 comprising N,N-dimethylpropylenediamine and fluoride within its intra-crystalline structure.

29. The molecular sieve of claim 27 having a characteristic X-ray powder diffraction pattern containing at least the d-spacings as set forth in Table IIb.

30. The molecular sieve of claim 29 comprising N,N-dimethylpropylenediamine and fluoride within its intra-crystalline structure.

31. A method for the manufacture of a molecular sieve catalyst composition, the method comprising forming a molecular sieve catalyst composition from a mixture comprising at least one formulating agent and at least one aluminophosphate and/or silicoaluminophosphate molecular sieve of CHA framework type comprising optionally within its intra-crystalline structure, fluoride and at least one template containing one or more N,N-dimethylamino moieties.

32. A silicoaluminophosphate molecular sieve having a Si/Al ratio of from 0.01 to 0.1 and comprising fluoride.

33. The silicoaluminophosphate molecular sieve of claim 32, having a Si/Al ratio of from 0.02 to 0.08.

34. The silicoaluminophosphate molecular sieve of claim 32, having a Si/Al ratio of from 0.02 to 0.07.

* * * * *